United States Patent [19]

Himmler

[11] Patent Number: 5,016,470
[45] Date of Patent: May 21, 1991

[54] APPARATUS FOR TESTING MOTOR VEHICLE TIRES

[75] Inventor: Günther Himmler, Darmstadt, Fed. Rep. of Germany

[73] Assignee: Gebr. Hofmann GmbH & Co. KG Maschinenfabrik, Pfungstadt, Fed. Rep. of Germany

[21] Appl. No.: 558,350

[22] Filed: Jul. 27, 1990

[30] Foreign Application Priority Data

Oct. 17, 1989 [DE] Fed. Rep. of Germany ....... 3934626

[51] Int. Cl.$^5$ ........................................... G01M 17/02
[52] U.S. Cl. .................................. 73/146; 73/862.65
[58] Field of Search ................. 73/146, 862.65, 862.54

[56] References Cited

U.S. PATENT DOCUMENTS 4,918,983  4/1990  Himmler .............................. 73/146

Primary Examiner—Donald O. Woodiel
Attorney, Agent, or Firm—Cushman, Darby & Cushman

[57] ABSTRACT

In an apparatus for testing a motor vehicle tire and in particular for ascertaining characteristic parameters of a bead thereof, the bead of the tire is subjected to stretching by radially outwardly displaceable clamping jaws and the compression force applied to the tire by the respective clamping jaws are measured by force measuring means. Each of the force measuring means includes a respective measuring body in which a force transmission portion carries the actuating force applied to the respective clamping jaw and experiences deformation in consequence of the force. The force transmission portion bears strain gauges to measure the force, and it is supported by resiliently bendable support portions in such as way that the measuring body is substantially insensitive to moments and transverse forces which could result from radial guidance for the clamping jaws.

19 Claims, 1 Drawing Sheet

APPARATUS FOR TESTING MOTOR VEHICLE TIRES

BACKGROUND OF THE INVENTION

Motor vehicle tires can no longer be considered as merely constituting an accessory item of equipment on a motor vehicle, but are effectively an important structural element thereof. It is precisely from the point of view of safety and driving and road-holding characteristics at elevated speeds that a satisfactory set of tires on a motor vehicle is absolutely necessary. However, in the production of motor vehicle tires, it is inevitable that the production process will involve deviations from the desired tire shape and configuration, and they can have considerable effects on the vehicle from the point of view of safety.

If an effort to remedy that situation, besides the conventional tire testing procedures such as ascertaining unbalance of the tire measuring radial and lateral out-of-truth or run-out of the tires, procedures for testing tires in respect of uniformity when subjected to forces acting thereon, and for testing tires in respect of bead characteristic parameters are operations which are becoming more and more important in modern times. In particular the bead contact pressure with which the tire is fitted on to a wheel rim is a factor of major significance. Especially when a vehicle is travelling at high speeds and when it is negotiating a curve, a tire is subjected to high forces which tend to pull it off the motor vehicle wheel rim. If those forces overcome the resilient forces opposed thereto on the part of the tire and by the inflation pressure therein, the wheel may suffer from the feared rim-off effect, namely a situation in which the tire jumps off the rim. On the other hand, the tire seating forces with which the tire is carried on the rim should not exceed certain levels as otherwise it becomes very difficult if not impossible to fit the tire to a wheel.

One form of apparatus for testing motor vehicle tires in particular with a view to preventing the occurence of the abovementioned rim-off effect, is to be found in German patent specification No. 1 773 367. That apparatus comprises clamping means which are applied against the inner bead of the tire, distributed around the circumference of a circle, and are displaceable in an outward direction. The apparatus has force measuring means which are associated with respective ones of the clamping means, for measuring and recording, in relation to peripheral angle of the tire, the compression forces with which the clamping means, which can be in the form of clamping jaws, are pushed over the same distances against the inner bead of the tire. In that way it is possible to arrive at an accurate picture about the bead parameters of the tire.

SUMMARY OF THE INVENTION

An object of the present invention is to provide a motor vehicle tire testing apparatus which is so designed as substantially to eliminate moments and forces which can act on a force measuring component thereof in such a way as to falsify the measurement values produced.

Another object of the present invention is to provide a motor vehicle tire testing apparatus which gives reliable testing results while being of a simple design cofiguration.

Yet another object of the present invention is to provide a motor vehicle tire testing apparatus capable of testing a tire from a number of points of view in regard to parameters thereof, without involving major structural complications.

In accordance with the present invention those and other objects are attained by a motor vehicle tire testing apparatus comprising clamping means which are adapted to be applied gainst the inner bead of a tire to be tested, distributed around the circumference of a circle, and are adapted to be displaced in a radially outward direction. The apparatus includes force measuring means, each of which is associated with a respective one of the clamping means and which, in the radially outwardly directed movement of the latter, are operable to detect a compression force transmitted to the respective angular region of the inside circumference of the tire bead by the respective clamping means. The detected compression forces are displayed in a display means, possibly in relation to circumferential angle of the tire. Each force measuring means more particularly comprises a measuring body which is connected to the respective clamping means associated therewith, by way of a central force transmission portion which extends in the direction of the force radially with respect to the axis of the tire. The force transmission portion carries strain gauges which are connected to provide a measuring bridge configuration.

As will be seen in greater detail hereinafter, the apparatus according to the invention provides for accurate measurement of the compression forces which are transmitted to the internal bead of the tire in the checking operation, without such measurement being falsified by virtue of forces being transmitted through the arragement in such a way as not to act on the strain gauges. A further advantage of the construction of the invention is that strain gauges can be used as the force detecting means instead of for example piezoelectric elements which suffer from the difficulty that under some circumstances they may exhibit drift phenomena which make it difficult to perform static measurement operations.

The invention also provides a measuring body which is advantageously of such a design configuration that, by virtue of the fact that a part of the force transmission portion is mounted in the manner of a parallel linkage assembly, in the region of the measurement locations, moments and forces which could falsify the measurement results are substantially eliminated, in relation to the strain gauges, and the forces which are to be detected by the strain gauges are not influenced by the above-mentioned falsifying moments and forces. For that purpose the compression force is applied to the respective clamping means, which is preferably in the form of a clamping jaw, by way of the force transmission portion which is disposed in the central radially extending plane of the measuring body. The force transmission portion which is of an elongate configuration and which extends radially with respect to the axis of the tire being tested is preferably of a two-part configuration, wherein one part is supported on a frame means of the measuring body by way of resiliently bendable support portions which extend substantially perpendicularly to the direction in which the force is applied to the bead of the tire, in a parallelogram link-like configuration. The other part of the force transmission portion is in the form of a measuring limb means on which the strain gauges are disposed. The measuring limb means is supported by one end thereof on the frame means of the measuring body while its other end is connected to the first-mentioned part which is mounted by a parallelogram link-like arrangement.

The above-mentioned arrangement of the support elements preferably comprises two support elements which are arranged in the immediate vicinity of the respective clamping means, and two support elements which are arranged at a greater spacing therefrom. in each of those two paris of support elements, a respective support element is arranged on one side of the horizontal central plane of the measuring body while the other is arranged on the other side. When the measuring assembly is disposed horizontally therefore the support elements are disposed above and below the longitudinal central plane of the measuring body. The resiliently bendable support elements are preferably of a plate-like configuration.

The support elements and the force transmission portion are only supported in the frame means of the measuring body, being free from any radial guidance therein. Of the measuring body, only the components of the frame means thereof are guided radially, more specifically an upper horizontally extending frame portion and a lower horizontally extending frame portion of the frame means are guided in a radial guide arrangement which can be in the form of a radial guide passage, on a top surface, a bottom surface and lateral surfaces respectively. The force transmission portion and the support elements are at a given spacing in relation to the guide surfaces provided by the radial guide passage so that they are not impeded in their movement within the frame means of the measuring body, in other words they are not affected by forces and moments which can occur when the measuring body and the clamping means are displaced radially outwardly.

To perform a tire testing operation, the clamping jaws must be moved radially outwardly over the same operating distances. For that purpose the apparatus may include a common actuating means such as a ram member which is of a tapering configuration and which acts against corresponding thrust faces on the frame means of the measuring body, thereby to displace the measuring body together with the associated clamping jaw radially outwardly at the same time, over the same operating distances. The forces are applied to the clamping means in that situation in such a way that the flow of force if by way of the frame means of each measuring body, the support elements and the force transmission portion which is held in a central position by the support elements, to the clamping means or jaws. The compression forces which are thus applied to the internal bead of the tire are measured by the strain gauges.

Preferably the strain gauges are arranged on the part of the force transmission portion which is in the form of a measuring limb. The measuring limb is connected on the one hand to the part of the force transmission portion which is supported in the frame means of the measuring body by a parallelogram-link type assembly, while with its other end the measuring limp is connected to a portion of the frame means of the measuring body. The measuring limb is preferably of a rectangular cross-section, with the height of the measuring limb, being its dimension which extends parallel to the axis of the tire, being greater than the width of the measuring limb. The measuring limb extends with its length radially with respect to the axis of the tire.

In accordance with another preferred feature, strain gauges are arranged at each side surface of the measuring limb which is of a rectangular configuration. The strain gauges which are disposed on the side surfaces which extend radially and perpendicularly with respect to the tire, being the upper and lower side surfaces of the measuring limb, preferably serve to detect upsetting of the measuring limb. For that purpose they are preferably arranged in the longitudinal direction of the measuring limb, that is to say radially with respect to the axis of the tire.

Preferably the strain gauges on the side surface of the measuring limb, which extend parallel to the axis of the tire, serve to detect a thickening of the measuring limb, for which purpose they are oriented parallel to the axis of the tire.

When the tire to be tested is subjected to the clamping effect, the clamping means may also engage the internal bead of the tire, eccentrically in relation to the longitudinal central plane of the measuring body. Therefore, when dealing with tires of different sizes, the spacing of the force engagement points of the clamping means against the internal beads of a tire from the longitudinal central plane of the measuring body or the frame means thereof may differ so that different torques come into effect in that situation. However the effect of those different torques on the strain gauges on the measuring limb is substantially or entirely overcome in the arrangement in accordance with the invention by virtue of the parallelogram-link type guidance of the part of the force transmission portion which is connected to the clamping means.

In accordance with yet another preferred feature of the invention, clamping shoes which can be adapted to respective internal beads of tires to be tested can be secured to the clamping means for applying the clamping forces to the bead of a tire to be tested.

Further objects, features and advantages of the present invention will be apparent from the following description of a preferred embodiment.

DESCRIPTION OF THE PREFERRED EMBODIMENT

Figure 1:
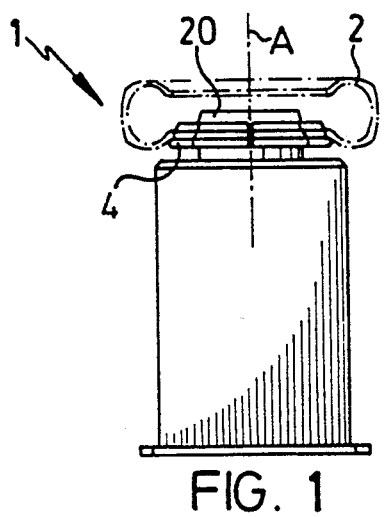
FIG. 1 is a side view of a motor vehicle tire testing apparatus incorporating the principles of the present invention.

Referring firstly to FIG. 1 shown therein is a testing apparatus for determining the bead characteristic parameters of motor vehicle tires. In use of the apparatus, a motor vehicle tire 2 which is to be tested is disposed in a horizontal position, with the tire axis as indicated at A extending vertically, with its tire bead which is the lower tire bead of the tire being fitted on to clamping means 4 which are distributed around the circumference of a circle and which form a bead receiving configuration approximately corresponding to that of one half of a wheel rim. In the embodiment illustrated the apparatus has eight radially outwardly displaceable calmping means in the form of radially outwardly displaceable wheel rim segments. The wheel rim segments constitute clamping jaws which can be releasably secured to a measuring body 3 by screw means to permit testing of different sizes of tires with the same measuring bodies 3. The measuring bodies 3 and the clamping means 4 may be formed integrally with each other. When the clamping means are simultaneously displaced radially outwardly over the same operating distances, the tire bead is thus stretched and opposes that stretching effect by means of a force which is thus to be measured. For that purpose, operatively associated with the individual clamping means 4 are respective force measuring means of which FIG. 3 shows one force measuring means, together with a clamping means 4.

Figure 3:
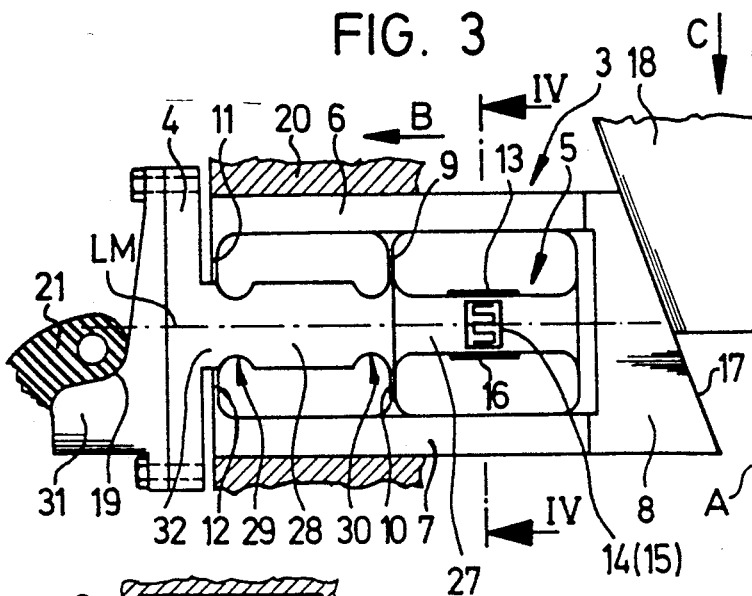
FIG. 3 is a partly sectional view of a force measuring arrangement operating in accordance with the principles of the invention, used in a motor vehicle tire testing apparatus as shown in FIGS. 1 and 2.
Figure 2:
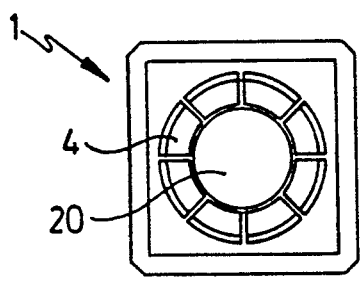
FIG. 2 is a plan view of the apparatus shown in FIG. 1.
Figures 4, 5:
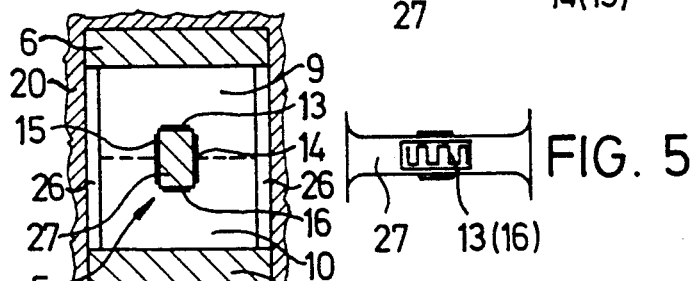
FIG. 4 is a view in section taken along line IV—IV in FIG. 3.
FIG. 5 is a plan view of a measuring limb of the force measuring arrangement shown in FIGS. 3 and 4.

Looking now at FIG. 3, the force measuring means illustrated comprises the measuring body 3 which includes a frame structure comprising an upper horizontally extending frame portion 6, a lower horizontally extending frame portion 7 and a substantially vertically arranged frame portion 8. The frame structure 6, 7, 8 is guided in a radial guide arrangement 20. For that purpose, as shown in FIG. 4, the upper frame portion 6 and the lower frame portion 7 bear against a top surface and a bottom surface of the radial guide arrangement 20. The radial guide arrangement 20 thus has for each measuring body 3 a radial guide passage 26 which extends radially in the main body portion of the guide arrangement 20.

Referring now once again to FIG. 3, it will be seen therefrom that the vertical frame portion 8 which is disposed in opposite relationship to the clamping means 4 has an inclinedly extending thrust surface 17 against which bears a thrust ram member 18 which is of a frustoconical configuration at least in its operative portion, to provide an actuating means for the clamping assembly. The frustoconical surface of the member 18 will thus co-operate with the corresponding thrust surface 17 on each of the frame portions 8. The member 18 is displaced in an axial direction as indicated by the arrow C in FIG. 3 by a suitable drive arrangement (not shown), for example a hydraulic piston cylinder unit. As therefore the member 18 moves downwardly in the direction indicated by the arrow C in FIG. 3, it will move each of the frame structures 6 through 8 radially outwardly, as indicated by the arrow B in FIG. 3.

A central force transmission portion 5 is supported in the frame means 6 through 8, in the manner which can be clearly seen from FIG. 3. More specifically, a first part 28 of the force transmission portion 5 which is connected to the respective clamping means or jaw 4 is supported in a horizontal longitudinal central plane as indicated by LM by means of support elements or portions 9, 10, 11 and 12 constituting a parallelogram-link type arrangement. It will be seen that the support portions 9 and 10 are arranged in opposite relationship on respective sides of the force transmission portion 5, and similarly in regard to the support portions 11 and 12. In that way the measuring body 3 and more particularly the frame portion 8 thereof, which is subjected to the actuating force of the ram member 18, is connected to the clamping means 3 for the transmission of force thereto.

The support portions 9, 10, 11 and 12 are of a resiliently bendable nature and, as in the illustrated construction, may each be of a plate-like configuration, as can be clearly seen from FIG. 4. It would also be possible for each of the support portions to be in the form of a spring bar portion, but that will generally involve additional expenditure in terms of manufacture, in comparison with the plate-like configuration.

The support portions 9 through 12 provide a support arrangement which is operative in the manner of a parallelogram-link assembly to support the part 28 of the force transmission portion 5 between the upper frame portion 6 and the lower frame portion 7. For that purpose, the two support portions 11 and 12 which are immediately adjacent to the rear or inwardly facing surface of the clamping means 4, which surface therefore faces towards the right in FIG. 3, extend substantially in a vertical direction with respect to the longitudinal central plane LM of the measuring body 3, with the support protion 11 being arranged above that plane and the support portion 12 being disposed below that plane. The two support portions 11 and 12 are at only a small spacing relative to the adjacent inwardly facing surface of the clamping means 4 so as to ensure a certain degree of free motion for the clamping means 4 when the internal bead of the tire as indicated at 21 is subjected to a stretching effect by virtue of the outward movement of the clamping means. The clamping means 4 is held at the spacing by the centrally disposed force transmission protion 5.

A clamping shoe 31 may be secured to the respective clamping means 4, being adapted to the respective internal bead 21 of the tire to be subjected to testing by the testing apparatus. Different clamping shoes can thus be fitted to the arrangement to deal with testing of different tires.

The other two support portions 9 and 10 extend parallel to the above-discussed support portions 11 and 12 and are thus at a greater spacing from the clamping means 4 than the support portions 11 and 12. In this case also the arrangement is such that the support portion 9 is disposed above the longitudinal central plane LM while the support portion 10 is disposed below that plane.

As can be seen in particular from FIG. 4 to which reference is now again directed, the support portions 9 through 12 and the force transmission portion 5 are arranged in the radial guide passage 21 provided by the guide arrangement 20, in such a way that they are at a spacing from the guide surfaces of the guide passage 26 and are thus only supported between the upper frame portion 6 and the lower frame portion 7, thereby providing the above-mentioned parallelogram-type guide effect for the force transmission portion 5.

Referring now again to FIG. 3, a second part of the force transmission portion 5 is in the form of a measuring limb as indicated at 27. The measuring limb 27 is of rectangular cross-secton, the height thereof, that is to say its dimension as measured parallel to the axis A of the tire being testd, being greater than its width, that is to say the dimension of the measuring limb 27 in a direction which is transverse and perpendicular with respect to the axis A of the tire. The four side surfaces of the measuring limb 27 carry respective strain gauges as indicated at 13, 14, 15 and 16. As can be seen in particular from FIG. 3, the strain gauges 14 and 15 are oriented parallel to the axis A of the tire, on the side surfaces of the measuring limb 27 which extend parallel to that axis A. Those strain guages 14 and 15 therefore detect a variation in the thickness of the measuring limb 27 when the internal bead 21 of the tire being tested is subjected to a stressing effect by outward movement of the clamping means 4.

As can be seen from FIG. 5, the other strain gauges 13 and 16 which are carried on the upper and lower side surfaces of the measuring limb 27 are oriented in the longitudinal direction thereof, that is to say radially with respect to the axis A of the tire to be tested.

Looking back now at FIG. 3, it will be seen therefrom that one end of the measuring limb 27 is connected to the part 28 of the force transmission portion 5, which is guided by the parallelogram link-type assembly in the frame structure 6 through 8 of the measuring body, with the connecting location being in the region of the support portions 9 and 10. The other end of the measuring limb 27 is connected to the frame portion 8 bearing the thrust surface 17 co-operating with the thrust ram member 18.

If the clamping means 4 comes to bear against the internal bead 21 of the tire to be tested, outside the longitudinal central plane indicated at LM in FIG. 3, moments resulting therefrom are not transmitted to the strain gauges 13 through 16 or they are transmitted thereto only to a slight degree, thereby substantially or entire eliminating falsification of the measurement values obtained, as a result thereof.

Preferably the part 28 of the force transmission portion 5 may also be provided with constricitons as indicated at 29 and 30, thereby to provide for better diversion of forces and moments which may have an interference effect. Those forces and moments are diverted by way of the horizontal frame portions 6 and 7 into the radial guide arrangement 20 and cannot therefore reach the region the measuring limb 27 on which the strain gauges 13 through 16 are disposed.

Figure 6:
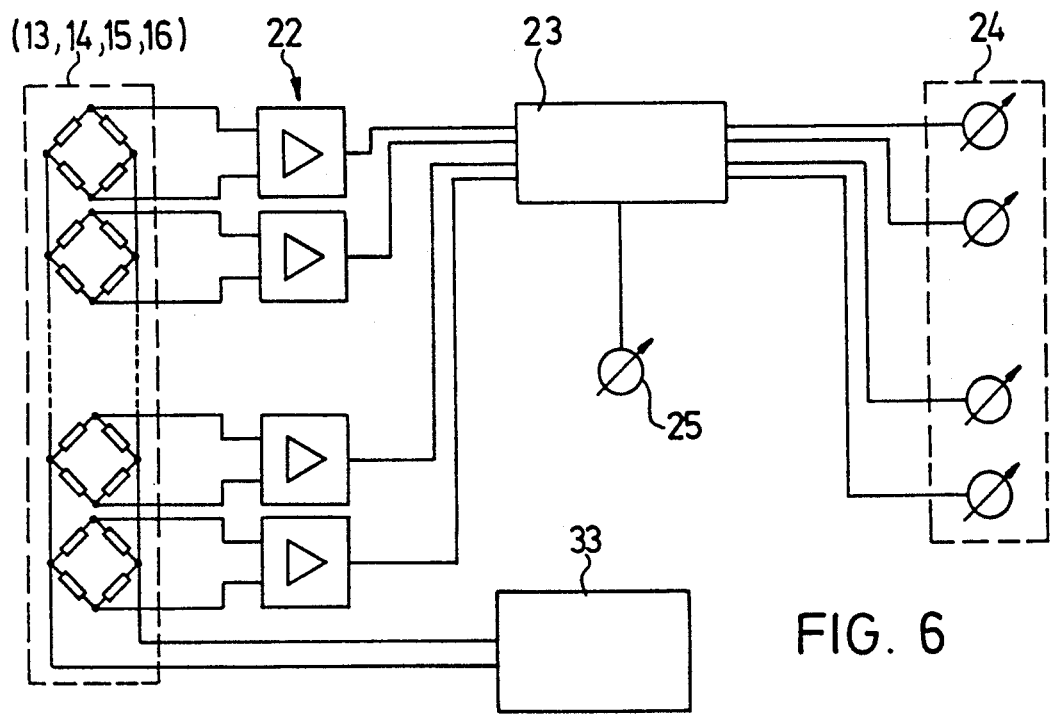
FIG. 6 is a block circuit diagram of a circuit arrangement for processing the force measurement signals for display thereof.

As already mentioned, the strain gauges 13 and 16 are operative to detect upsetting of the measuring limb 27 while the strain gauges 14 and 15 are operative to detect variations in the thickness of the measuring limb 7. The strain gauges 13 through 16 are connected to form measuring bridges as shown in FIG. 6, way of electrical connecting wires which are not illustrated. A respective measuring bridge is provided for each measuring body 3 of the force measuring arrangement. In that respect it will be noted that FIG. 6 shows measuring bridges operatively associated with four force measuring arrangements. It will be appreciated that the apparatus may include more than four force measuring arrangements arranged in such a way as to be distributed around the inside circumference of the tire to be tested, depending on the number of clamping means in the apparatus. That is indicated in FIG. 6 by the dashed line box around the measuring bridges.

It will be noted at this point that the ratio between a variation in thickness or thickening of the measuring limb 27 to upsetting thereof is 0.3 in the illustrated embodiment. The interconnected strain gauge measuring bridges therefore have a bridge factor of 2.6. That results from the strain gauges 13 and 16 which are oriented longitudinally of the measuring limb or radially with respect to the axis A of the tire, each with a factor of 1, and the two strain gauges 14 and 15 which are each oriented transversely with respect to the measuring limb 27, each with a factor of 0.3. By virtue of that arragement, forces originating from the tire and acting outside the longitudinal central plane LM do not have any influence in regard to falsification of measurement values, on the measurement value produced by the strain gauges 13 through 16.

The mode of operation of the force measuring arrangement shown in the drawings in a tire testing operation is as follows:

In order for the individual clamping means 4 to be moved jointly radially outwardly over the same distances, the thrust ram member 18 is moved axially downwardly in FIG. 3 in the direction indicated by the arrow C by the driving means (not shown) operatively associated therewith. As the measuring bodies 3 all bear by way of their thrust surfaces 17 against the tapering surface of the common thrust ram member 18, they are simultaneously moved radially outwardly in the direction indicated by the arrow B in FIG. 3. A stretching force is applied to the respective regions of the internal bead 21 of the tire, which bear against the respective clamping means 4 in a contact region indicated at 19 of a clamping shoe 31. The flow of force between the member 18 and the internal bead 21 of the tire to be tested goes by way of the frame portion 8, the force transmission portion 5, the clamping means 4 and the clamping shoe carried thereon. The part 28 of the force transmission member 5, which is supported by the parallelogram-link assembly formed by the support portions 9 through 12 is provided integrally with the clamping means 4 by way of a connecting portion 32, and the force required for the tire bead stretching effect is there transmitted into the clamping means 4 and thus the bead 21 to be stretched.

As FIG. 3 shows, the longitudinal central plane LM of the measuring body 3, being the plane in which the force transmission portion 5 lies, is displaced in relation to the contact region 19 against which the internal bead 21 of the tire to be tested bears. The longitudinal plane LM is thus displaced relative to the contact region 19 in a direction towards the central plane of the tire being tested. Thus, moments which occur upon stretching of the tire bead 21 are carried by the resiliently bendable support portions 9 through 12 and therefore cannot have an effect of falsifying measurement results, on the strain gauges.

The compression forces which occur when the internal bead of the tire is subjected to a stretching force result in substantially pure upsetting and thickening of the measuring limb 27, and those variations in the measuring limb 27 can thus be detected by the strain gauges 13 through 16. That deformation of the measuring limb 27 is proportional to the compression force which is transmitted by the respective clamping means 4 and which acts radially with respect to the axis A of the tire. As mentioned above, each measuring body 3 has a measuring bridge associated therewith, formed from the strain gauges 13 through 16 thereof. FIG. 6 shows four such measuring bridges; in a practical situation, four force measuring assemblies which are distributed uniformly around the internal bead of the tire to be tested are sufficient for determining the bead characteristic parameters of the tire. If a higher degree of accuracy is required, for example when carrying out laboratory investigations, the apparatus may have more force measuring arrangements.

Referring still to FIG. 6, a common measuring bridge voltage source 33 is provided for the measuring bridges formed by the respective sets of strain gauges 13 through 16. The bridge output signals are passed by way of associated amplifier devices 22 to a signal processing circuit 23 of suitable configuration in which the signals can be processed in such a way that they are suitable for providing a display in respect of the compression forces involved, in relation to circumferential angle on the tire. An angle-related display of that kind can be provided in a suitable display device as indicated at 24 in FIG. 6.

However it is also possible to form the arithmetic mean of all forces acting on the tire bead, for example by means of a suitable mixer device included in the signal processing circuit 23, with that arithmetic mean then being displayed in a suitable display device. A corresponding display device for the radial clamping force which is obtained in that way is indicated at 25 in FIG. 6.

The above-described and illustrated tire testing apparatus may be used to ascertain any bead characteristics which are of interest. That substantially involves the capacity for fitting of the tire on to a motor vehicle wheel rim, which can be ascertained by carrying out a testing operation in which a given maximum force is not to be exceeded in order to produce a predetermined stretching effect in regard to the bead of the tire. It is also possible to effect a test in regard to the rim-off effect referred to above, in which, with a given total force applied to the tire bead, it is only to stretch by a specific amount. In addition the bead must have the same degree of elasticity at all points on its circumference, that is to say, when subjected to a stretching effect, it should not yield to a greater extent at some point at its internal circumference, than at any other point thereon.

The measurement results which are obtained in that way are extremely expressive with the described apparatus as each force measuring assembly uses a measuring body 3 in which the strain gauges 13 through 16 are disposed in such a fashion that they are at least substantially insensitive to transverse forces and moments.

It will be appreciated that the above-described apparatus has been set forth solely by way of example and illustration of the teachings of the present invention and that various modifications and alterations may be made therein without thereby departing from the spirit and scope of the invention.

I claim:

1. Apparatus for testing a motor vehicle tire comprising:
   clamping means disposed in a circular array and adapted to be displaced in a radially outward direction to bear against the internal bead of a tire to be tested;
   force measuring means each associated with a respective clamping means and adapted, in the radially outward movement of the clamping means, to detect the compression force applied to the respective inner circumferential angular region of the tire bead by each clamping means, each force measuring means including a measuring body having a substantially central force transmission portion which is connected to the respective clamping means and which extends in the direction of said force radially with respect to the axis of the tire, and strain gauges on the force transmission portion and connected to form a measuring bridges; and
   a display means for displaying the detected compression forces.

2. Apparatus as set forth in claim 1 wherein said display mean is operable to display said detected compression forces in relation to angular circumferential locations on said tire.

3. Apparatus as set forth in claim 1 wherein said measuring body includes a frame means for supporting said force transmission portion, wherein the force transmission portion comprises first and second parts in the direction of said force, wherein the first part of the force transmission portion is in the form of a measuring limb and carries the strain gauges and wherein the second part is supported on the frame means of the measuring body in a parallel link-like configuration.

4. Apparatus as set forth in claim 3 wherein the second part of the force transmission portion is connected to the clamping means and the measuring limb is supported on a portion of the frame means of the measuring body, which is disposed in opposite relationship to the clamping means.

5. Apparatus as set forth in claim 3 wherein the measuring limb is of rectangular cross-section and is provided with strain gauges operable to detect at least upsetting of said measuring limb.

6. Apparatus as set forth in claim 5 wherein the dimension of the measuring limb in a direction parallel to the axis of the tire is greater than the dimension of the measuring limb which is transverse with respect to said axis.

7. Apparatus as set forth in claim 3 including strain gauges adapted to detect an increase in the thickness of the measuring limb in the direction of the axis of the tire.

8. Apparatus as set forth in claim 3 including strain gauges oriented parallel to the axis of the tire at the measuring limb side surfaces which are parallel to said axis of the tire, for measuring an increase in thickness of the measuring limb under the effect of said compression forces.

9. Apparatus as set forth in claim 3 including strain gauges arranged at the side surfaces of the measuring limb which are disposed parallel to the axis of the tire and which extend radially with respect thereto, and oriented in the longitudinal direction of the measuring limb, said direction being radial with respect to the axis of the tire, for measuring upsetting of the measuring limb.

10. Apparatus as set forth in claim 3 comprising strain gauges arranged at all four side surfaces of the measuring limb.

11. Apparatus as set forth in claim 3 wherein said second part of the force transmission portion has constriction means.

12. Apparatus as set forth in claim 3 and further including resiliently bendable support portions extending perpendicularly to the longitudinal direction of the force transmission portion and supporting said second part of the force transmission portion on the frame means of the measuring body in a parallelogram link-like configuration.

13. Apparatus as set forth in claim 12 wherein the support portions form first and second pairs of support portions.

14. Apparatus as set forth in claim 3 including a radial guide means adapted to guide said frame means and wherein the support portions and the force transmission portion are supported only in the frame means and thereby free from the radial guide means.

15. Apparatus as set forth in claim 1 wherein the clamping means are in the form of clamping jaws which are each in one piece with the respective measuring body.

16. Apparatus as set forth in claim 3 wherein the frame means of the measuring body is provided with a thrust surface, and further including an actuating thrust means adapted to bear against said thrust surface for producing radial displacement of said clamping means.

17. Apparatus as set forth in claim 1 wherein the longitudinal central plane of the force transmission portion is displaced axially towards the central plane of the tire relative to a pressure region with which the clamping means bear against the internal bead of the tire.

18. Apparatus as set forth in claim 1 including a clamping shoe adapted to the respective bead of the tire to be tested and securable to the clamping means.

19. Apparatus for testing a motor vehicle tire comprising:
   a support structure;
   a plurality of clamping jaws disposed in a circular array on the support structure;
   actuating means for displacing the respective clamping jaws radially outwardly in relation to said circular array, thereby to bring them into contact against the bead of a tire to be tested;
   a plurality of force measuring means each associated with a respective said clamping jaw and operable to detect the compression force applied to a respective portion of said tire bead by the clamping jaw when said clamping jaws are moved radially outwardly, each said force measuring means comprising: a support body portion; a movable structure engageable by said actuating means and slidable in said support body portion in guided relationship therewith in said radially outward direction, the respective clamping jaw being carried by said movable structure, the movable structure comprising a frame means defining a space therewithin, a central force transmission portion extending within said space radially with respect to the axis of the tire and operatively connected to said clamping jaw, and a plurality of flexurally resilient support portions extending substantially perpendicularly to the direction of actuation of said movable structure and connecting said force transmission portion to said frame means while permitting movement of said force transmission portion relative to said frame means by virtue of resilient flexural deformation of said support portions; and strain gauge means disposed on said force transmission portion and connected into a measuring bridge configuration; and
   display means for displaying the forces detected by the force measuring means.

* * * * *